United States Patent Office 3,736,264
Patented May 29, 1973

3,736,264
CATALYST COMPOSITION AND THE PROCESS FOR POLYMERIZING UNSATURATED HYDROCARBONS USING THIS COMPOSITION
Yves Chauvin, Saint Germain-en-Laye, France, assignor to Institut Francais du Petrole des Carburants et Lubrifiants, Rueil-Malmaison, and Societe Nationale des Petroles d'Aquitaine, Tour Aquitaine, Courbevoie, France
No Drawing. Filed June 26, 1970, Ser. No. 50,337
Claims priority, application France, July 2, 1969, 22,453; Nov. 25, 1969, 40,688
Int. Cl. C07c 3/10
U.S. Cl. 252—429 R                 15 Claims

ABSTRACT OF THE DISCLOSURE

This invention relates to new catalyst compositions which may be used for polymerizing unsaturated compounds. They comprise a flouride of a Group V–A, V–B or VI–B element together with a nickel organo compound, for example a zerovalent nickel compound, a nickel-phosphine complex, a $\pi$-allyl nickel complex or a cyclopentadienyl nickel complex.

---

This invention relates to new catalyst compositions which may be used for polymerizing unsaturated compounds.

The prior art catalysts include such nickel compounds as the zerovalent nickel complexes or the $\pi$-allyl nickel complexes which may be activated with aluminum compounds, for example aluminum halides and particularly aluminum trichloride.

One object of the invention is to provide a new improved catalyst composition obtained by admixing (a) a fluoride of an element from the group V–A, V–B or VI–B with (b) a nickel organocompound.

The fluoride may be selected, for example, from the group consisting of phosphorus, arsenic, antimony, vanadium, niobium, tantalum, molybdenum and tungsten fluorides, the preferred fluorides being simple fluorides such as $PF_5$, $AsF_5$, $SbF_5$, $VF_5$, $NbF_5$, $TaF_5$, $MoF_6$ and $WF_6$.

The nickel compounds which may be used in this invention are, for example, the following:

(1) The zerovalent nickel complexes, for example the substitution derivatives of nickel carbonyl, corresponding to the general formula: $Ni(CO)_xL_{4-x}$, in which L is a coordinate which contains such a heteroatom as phosphorus, arsenic, antimony or sulfur, and $x$ is an integer from 0 to 3, as well as the nickel complexes of unsaturated compounds such as, for example, the mono- and poly-ethylenic hydrocarbons. The coordinate L can also be defined as $M(Z)y$ wherein M is said heteroatom, Z is hydrocarbyl and $y$ is equal to the valence of M.

(2) The compounds which have one or two nickel-carbon bonds, for example those of the formula:

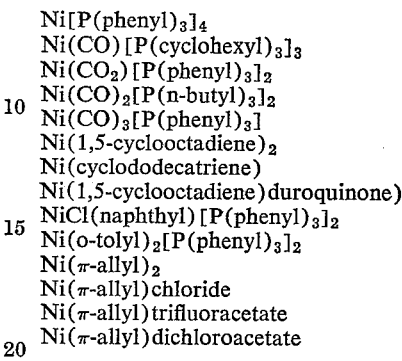

in which L is a coordinate such as a phosphine, X is a halogen atom, for example chlorine or bromine, and R and R' are orthosubstituted phenyl radicals, for example o-tolyl, $\alpha$-naphthyl or $\alpha$-anthracenyl.

(3) The $\pi$-allyl nickel complexes and the cyclopentadienyl nickel complexes, particularly the $\pi$-allyl nickel compounds of the formula:

$$[Ni(\pi\text{-allyl})X]_n$$

in which X is an anion, for example $Cl^-$, $Br^-$, $CH_3COO^-$, $CF_3COO^-$, $CHCl_2COO^-$ or $CCl_3COO^-$, $n$ being 1 or 2, and the addition derivatives of the formula $Ni(\pi\text{-allyl})XL$ in which L is a coordinate, such as a phosphine, by way of example.

The following compounds are illustrative of the nickel compounds:

$Ni[P(phenyl)_3]_4$
$Ni(CO)[P(cyclohexyl)_3]_3$
$Ni(CO_2)[P(phenyl)_3]_2$
$Ni(CO)_2[P(n\text{-butyl})_3]_2$
$Ni(CO)_3[P(phenyl)_3]$
$Ni(1,5\text{-cyclooctadiene})_2$
$Ni(cyclododecatriene)$
$Ni(1,5\text{-cyclooctadiene})duroquinone)$
$NiCl(naphthyl)[P(phenyl)_3]_2$
$Ni(o\text{-tolyl})_2[P(phenyl)_3]_2$
$Ni(\pi\text{-allyl})_2$
$Ni(\pi\text{-allyl})chloride$
$Ni(\pi\text{-allyl})trifluoracetate$
$Ni(\pi\text{-allyl})dichloroacetate$ The catalytic compositions according to this invention may be used, for example, for polymerizing unsaturated hydrocarbons. They may be used for dimerizing or co-dimerizing, in liquid phase such monoolefins as ethylene, propylene, n-butenes, pentenes and hexenes, and exhibit, in these reactions, an outstanding activity. When ethylene is subjected to a dimerization reaction, mixtures of n-butene are mainly formed. From propylene there are obtained n-hexanes, methyl pentenes and dimethylbutenes. From n-butenes and propylene, there are obtained isohexenes, isoheptenes and isooctenes.

The fluorine compounds which give the best results are, in decreasing order of efficiency, niobium fluoride, antimony fluoride, tantalum fluoride, tungsten fluoride, arsenic fluoride and molybdenum fluoride.

When the two components of the catalyst composition are to be used for dimerizing and co-dimerizing unsaturated compounds, they are present, for example, in a molar amount of 0.1/1 to 10/1.

They are preferably admixed in the reaction medium in which they are used, each at a preferred concentration of 0.1 to 200 millimols per liter of liquid phase.

The dimerization or co-dimerization reaction may be carried out with or without a solvent. A preferred solvent is an aliphatic, cycloaliphatic or aromatic hydrocarbon, for example hexane, heptane, benzene or toluene, or a halide thereof, for example chlorobenzene or methylene chloride.

The reaction may be carried out at a temperature of −50 to 100° C. and preferably −20 to 50° C., the pressure being sufficient to maintain a liquid phase.

The catalyst compositions of this invention may be used as catalysts for co-dimerizing a conjugated diolefin with a monoolefin, for example for codimerizing 1,3-butadiene and a monoolefin such as ethylene, propylene, n-butenes, pentenes and hexenes.

In these reactions, the operating condtions are the same as those used in the dimerization and the codimerization of mono-olefins.

The following examples are given by way of illustration, not of limitation. Examples 1a, 1b, 2a, 3a, 4a, 22a, 23a and 24a are given for comparison purposes.

EXAMPLES 1 to 11

These examples have been carried out in a Grignard reactor free of air and moisture. The nature and the amounts of the starting materials (a and b), as well as the reaction times and the amounts of resulting dimers are given in Table I.

TABLE I

| Ex. | (a) | Amount (mM.) | Propylene (moles) | (b) | Amount (mM.) | Temperature | Dimers (g.) | Time |
|---|---|---|---|---|---|---|---|---|
| 1 | $NbF_5$ | 0.79 | 0.65 | $Ni(CO)_2[P(phenyl)_3]_2$ | 0.18 | 10 | 12.5 | 4 min. |
| 1a | $NbCl_5$ | 0.8 | 0.65 | do | 0.17 | 10 | 0 | 4 min. |
| 1b | $NbOCl_3$ | 0.78 | 0.65 | do | 0.19 | 10 | 0 | 4 min. |
| 2 | $MoF_6$ | 0.52 | 0.5 | $Ni(CO)_2[P(phenyl)_3]_2$ | 0.11 | 10 | 13 | 17 min. |
| 2a | $MoCl_5$ | 0.51 | 0.5 | do | 0.13 | 10 | 0 | 17 min. |
| 2b | $MoBr_4$ | 0.54 | 0.5 | do | 0.10 | 10 | 0 | 17 min. |
| 3 | $SbF_5$ | 0.6 | 0.5 | $Ni(CO)_2[P(phenyl)_3]_2$ | 0.2 | 10 | 15 | 20 min. |
| 3a | $AlCl_3$ | 5 | 0.5 | do | 1 | 10 | 15 | 20 min. |
| 4 | $TaF_5$ | 0.655 | 0.5 | $Ni(CO)_2[P(phenyl)_3]_2$ | 0.13 | 10 | 13.5 | 19 min. |
| 4a | $TaCl_5$ | 0.67 | 0.5 | do | 0.12 | 10 | 0 | 19 min. |
| 5 | $TaF_5$ | 0.61 | 0.57 | $Ni(CO)_3[P(phenyl)_3]$ | 0.12 | 20 | 10 | 2 hrs. |
| 6 | $SbF_5$ | 0.36 | 0.5 | $Ni(cyclooctadiene)_2$ | 1 | 10 | 5 | 3 hrs. |
| 7 | $AsF_5$ | 2.5 | 0.5 | $Ni(CO)_2[P(phenyl)_3]_2$ | 0.5 | 20 | 7 | 1 hr. 30 min. |
| 8 | $SbF_5$ | 0.69 | 0.47 | $Ni(CO)[P(cyclohexyl)_3]_3$ | 0.22 | 10 | 6 | 5 hrs. 30 min. |
| 9 | $PF_5$ | 5 | 0.5 | do | 0.5 | 10 | 5 | 1 hr. 15 min. |
| 10 | $VF_5$ | 0.57 | 0.5 | $Ni(CO)_2[P(phenyl)_3]_2$ | 0.12 | 10 | 4 | 24 hrs. |
| 11 | $WF_6$ | 2.7 | 0.5 | do | 0.5 | 10 | 2 | 3 hrs. |

In Example 7, there was used 10 mg. of toluene. The composition by weight of the mixture of dimers obtained in Examples 1, 3 to 9 and 11, as determined by vapor phase chromatography is shown in Tables II to IV.

TABLE II

Mixture of Example 1

| | Percent |
|---|---|
| 4-methyl-1-pentene | 5.85 |
| 4-methyl-2-pentenes | 28.84 |
| 2,3-dimethyl-butenes | 13.40 |
| 2-methyl-1-pentene + 1-hexene | 9.25 |
| 2-methyl-2-pentene + trans 2-hexene | 31.86 |
| Cis 2-hexene | 8.09 |
| 3-hexenes | 2.71 |

TABLE III

| Mixtures of example | 3 | 5 | 6 | 7 | 8 | 9 |
|---|---|---|---|---|---|---|
| 3,-dimethyl butene, percent | 8.4 | 27 | 8 | 4 | 29 | 14 |
| 2-methyl pentene, percent | 75.2 | 56 | 78 | 76 | 59 | 70 |
| n-Hexene, percent | 16.4 | 17 | 14 | 20 | 12 | 16 |

TABLE IV

| Mixtures of example | 4 | 11 |
|---|---|---|
| 4-methyl-1-pentene, percent | 1.56 | 8.55 |
| 4-methyl-2-pentene, percent | 37.06 | 51.03 |
| 2,3-dimethbl butenes, percent | 14.28 | 2.19 |
| 2-methyl-1-pentene, percent | 6.44 | 3.45 |
| 2-methyl-2-pentene, percent | 22.29 | 10.16 |
| n-Hexenes, percent | 18.37 | 24.66 |

EXAMPLES 12 to 20

Example 1 has been repeated, except that compounds (a) and (b) have been substituted with other compounds, as follows:

| Example | Compound (a) | Compound (b) |
|---|---|---|
| 12 | $NbF_5$ | $Ni[P(phenyl)_3]$ |
| 13 | $SbF_5$ | $Ni(cyclododecatriene)$ |
| 14 | $TaF_5$ | $Ni(1,5-cyclooctadiene)(duroquinone)$ |
| 15 | $TaF_5$ | $NiCl(naphthyl)[P(phenyl)_3]_2$ |
| 16 | $SbF_5$ | $Ni(o-tolyl)_2[P(phenyl)_3]_2$ |
| 17 | $NbF_5$ | $Ni(\pi-allyl)_2$ |
| 18 | $AsF_5$ | $Ni(\pi-allyl)Cl$ |
| 19 | $MoF_6$ | $Ni(\pi-allyl)OCOCF_3$ |
| 20 | $WF_6$ | $Ni(\pi-allyl)OCOCHCl_2$ |

The results were substantially the same as those of Example 1.

EXAMPLE 21

100 ml. of 2-butene (cis+trans), 0.8 mM. of $NbF_5$ and 0.28 mM. of $Ni(CO)_2[P(phenyl)_3]_2$ have been introduced into a Grignard reactor of 250 ml. capacity.

The temperature was maintained at 30° C. and the propylene pressure was sufficient to have a molar ratio of propylene to butene of about 0.05 in the liquid phase.

After 5 hours, 25 g. of $C^+_5$ olefins have been obtained:

| | Percent |
|---|---|
| iso-Hexenes | 20 |
| iso-Heptenes | 38 |
| iso-Octenes | 10 |
| Higher olefins | 32 |

EXAMPLES 22 to 24a 100 ml. of chlorobenzene were introduced in a reactor of the Grignard type, free of air and moisture. The temperature was 20° C. The nature and the amounts of starting materials, the reaction time and the amounts of produced dimers are given in Table V.

TABLE V

| Ex. | (a) | Amount (mM.) | (b) | Amount (mM.) | Butadiene (g.) | Ethylene (bars) | Time | Dimers (g.) |
|---|---|---|---|---|---|---|---|---|
| 22 | $TaF_5$ | 0.61 | $Ni(CO)_2[P(phenyl)_3]_2$ | 0.18 | 52 | 8 | 30 min. | 12.2 |
| 22a | $TaCl_5$ | 0.61 | do | 0.18 | 52 | 8 | 30 min. | 0 |
| 23 | $NbF_5$ | 2.9 | do | 0.33 | 52 | 8 | 3 hrs. | 20.5 |
| 23a | $NbCl_5$ | 2.9 | do | 0.33 | 52 | 8 | 3 hrs. | 0 |
| 24 | $SbF_5$ | 0.61 | do | 0.18 | 52 | 6 | 3 hrs. | 7 |
| 24a | $SbCl_5$ | 0.61 | do | 0.18 | 52 | 6 | 3 hrs. | 0 |

In these examples, the mixture of the produced dimers had the following composition by weight (as determined by vapor phase chromatography).

| Example | 22 | 23 | 24 |
|---|---|---|---|
| 3-methyl-1,4-pentadiene | 5.2 | 5.5 | 5.4 |
| 1,4-hexadiene | 89.2 | 86.3 | 88.2 |
| 2,4-hexadiene | 5.6 | 8.1 | 6.1 |
| 1,5-hexadiene | 0 | 0.1 | 0.3 |

Trace amounts of methyl-1,3-pentadiene, 1,5-hexadiene and 3-methyl-1,3-pentadiene have been detected in the dimers mixture of Example 22.

EXAMPLES 25 to 33

Example 22 has been repeated except that the constituents (a) and (b) of the catalyst were the following:

| Example | (a) | (b) |
|---|---|---|
| 25 | $NbF_5$ | $Ni(\pi-allyl)OCOCF_3$ |
| 26 | $SbF_5$ | $Ni(1,5-cyclooctadiene)(duroquinone)$ |
| 27 | $TaF_5$ | $Ni(o-tolyl)_2[P(phenyl)_3]_2$ |
| 28 | $AsF_5$ | $Ni[P(phenyl)_3]_4$ |
| 29 | $WF_6$ | $Ni(cyclododecatriene)$ |
| 30 | $MoF_6$ | $NiCl(naphthyl)[P(phenyl)_3]_2$ |
| 31 | $NbF_5$ | $Ni(\pi-allyl)Cl$ |
| 32 | $SbF_5$ | $Ni(\pi-allyl)_2$ |
| 33 | $TaF_5$ | $Ni(\pi-allyl)OCOCHCl_2$ |

The results were substantially the same as in Example 22.

What is claimed as this invention is:

1. A catalyst composition consisting essentially of:
    (a) a fluoride of an element selected from the group consisting of elements of Group V–A, V–B, and VI–B of the periodic classification, and
    (b) an organic nickel compound selected from the group consisting of:

(i) a zerovalent nickel complex of the formula:

$$Ni(CO)_x[M(Z)y]_{4-x}$$

wherein M is a heteroatom selected from the group consisting of phosphorus, arsenic, antimony and sulfur, Z is hydrocarbyl, y is equal to the valence of M and x is an integer from 0 to 3 inclusive (ii) a compound of the formula

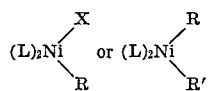

wherein L is a hydrocarbyl phosphine, X is a halogen atom, and R and R' are hydrocarbon ortho-substituted phenyl radicals;
(iii) nickel cyclopentadienyl; and
(iiii) a π-allyl nickel complex of the formula $$[Ni(\pi\text{-allyl})X]_n$$

wherein X is Cl⁻, Br⁻, CH₃COO⁻, CF₃COO⁻, CHCl₂COO⁻ or CCl₃COO⁻, n is 1 or 2; the molar ratio of the fluoride compound (a) to the nickel compound (b) being about 0.1:1 to to 10:1, said ratio being such that the catalyst composition is capable of functioning as a dimerization catalyst.

2. The composition of claim 1, wherein the organic nickel compound (b) is said zerovalent nickel complex of the formula:

$$Ni(CO)_x[M(Z)y]_{4-x}$$

in which M is a heteroatom selected from the group consisting of phosphorus, arsenic, antimony and sulfur, Z is hydrocarbyl, y is equal to the valence of M and x is an integer from 0 to 3 inclusive.

3. The composition of claim 1, wherein said fluoride (a) is selected from the group consisting of phosphorus fluorides, arsenic fluorides and antimony fluorides.

4. The composition of claim 1 wherein said fluoride (a) is selected from the group consisting of vanadium fluorides, niobium fluorides, tantalum fluorides, molybdenum fluorides and tungsten fluorides.

5. The composition of claim 1, wherein the organic nickel compound (b) is selected from the group consisting of compounds of said formulae:

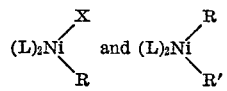

in which L is a hydrcarbyl phosphine, X is a halogen atom and R and R' are hydrocarbon ortho-substituted phenyl radicals.

6. The composition of claim 1, wherein the organic nickel compound (b) is selected from the group consisting of π-allyl nickel complexes and the cyclopentadienyl nickel complexes.

7. The catalyst composition as defined by claim 1 wherein, said fluoride is arsenic pentafluoride, and wherein said organic nickel compound is of the formula $$[Ni(\pi\text{-allyl})X]_n$$

wherein X is Cl⁻, Br⁻, CH₃COO⁻, CF₃COO⁻, CHCl₂COO⁻ or CCl₃COO⁻, n is 1 or 2.

8. The catalyst composition as defined in claim 1 wherein X is Cl⁻.

9. A composition as defined by claim 1 wherein the organic nickel compound is Ni(π-allyl)Cl.

10. A catalyst composition consisting essentially of:
(a) a fluoride of an element selected from the group consisting of phosphorous, arsenic, niobium, tantalum, and tungsten; and
(b) a complex between only nickel and unsaturated hydrocarbon, the molar ratio of (a) to (b) being about 0.1:1 to 10:1, said ratio being such that the catalyst composition is capable of fuctioning as a dimerization catalyst.

11. A catalyst as defined by claim 10 wherein said fluoride is PF₅.

12. A catalyst as defined by claim 10 wherein said fluoride is AsF₅.

13. A catalyst as defined by claim 10 wherein said fluoride is NbF₅.

14. A catalyst as defined by claim 10 wherein said fluoride in TaF₅.

15. A catalyst as defined by claim 10 wherein said fluoride is WF₆.

References Cited
UNITED STATES PATENTS

| | | | |
|---|---|---|---|
| 3,564,072 | 2/1971 | Butte | 252—429 R |
| 3,400,115 | 9/1968 | Dawans et al. | 252—429 A |
| 3,379,706 | 4/1968 | Wilke | 252—429 R |
| 3,414,629 | 12/1968 | McCall et al. | 252—429 R |
| 3,522,283 | 7/1970 | Wilke | 252—429 R |

PATRICK P. GARVIN, Primary Examiner

U.S. Cl. X.R.

260—680 B, 683.15 B